Nov. 24, 1925. Re. 16,215

E. TOBLER

COMBINATION LOCK

Original Filed Nov. 2, 1922

INVENTOR
ERNEST TOBLER.
BY
Shurtleff Mattern.
ATTORNEY

Reissued Nov. 24, 1925.

Re. 16,215

UNITED STATES PATENT OFFICE.

ERNEST TOBLER, OF BRUNSWICK, GERMANY, ASSIGNOR, BY MESNE ASSIGNMENTS, TO THE DEFENDER LOCK CO., INC.

COMBINATION LOCK.

Original No. 1,502,411, dated July 22, 1924, Serial No. 598,648, filed November 2, 1922. Application for reissue filed August 14, 1925. Serial No. 50,310.

*To all whom it may concern:*

Be it known that I, ERNEST TOBLER, a resident of Brunswick, Germany, citizen of the Swiss Confederation, have invented certain Improvements in Combination Locks, of which the following description, in connection with the accompanying drawings, is a specification, like characters on the drawings representing like parts.

This invention relates to a combination padlock, the present exemplary embodiment comprising a casing adapted for the reception of the two limbs of a shackle and provided with rotatable, notched rings which in one position lock the shackle by engagement with notches in its limbs and which release the shackle when, by certain relative adjustment, all the ring notches are set in alignment with each other and with the limbs, the rings being directly superposed and adapted to be transposed with respect to each other for changing the combination.

An object of the invention is to provide means whereby the combination of the lock may be readily changed without complicating the structure, and the present disclosed embodiment consists in arranging the notches of the shackle limbs in a relatively staggered position and in arranging the ring notches so that a change in the combination can be effected by reversing the shackle and by turning each of the rings over bodily.

A further object is to provide a combination lock which can be readily manipulated by any one knowing the combination by the sense of touch, so that it is possible to operate the lock in the dark.

With the above and other objects in view, an embodiment of the invention is shown by way of illustration in the accompanying drawings, and this embodiment will be hereinafter more fully described with reference thereto, and the invention will be finally pointed out in the claims.

Figure 1:
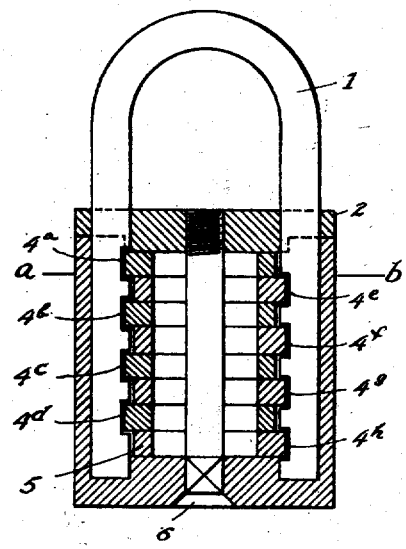
Figure 2:
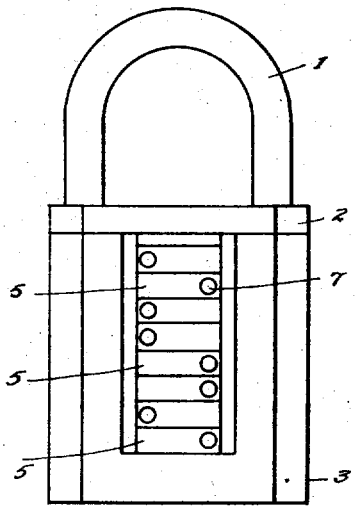
Figure 3:
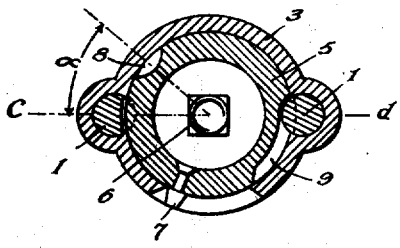

Fig. 1 of the accompanying drawings represents a vertical section of the padlock, according to the present embodiment, taken on the line *c—d* of Fig. 3, Fig. 2, a side view of the padlock, and Fig. 3, a cross-section on the line *a—b* of Fig. 1.

Figure 4:
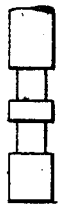
Figure 5:
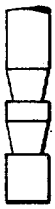

Figs. 4 and 5 are views showing different forms of notching the shackle limbs.

The padlock, according to the present embodiment of the invention, consists of a casing in which a plurality of rings 5, piled directly on each other, are rotatably arranged. There are also two diametrically opposed bores which are adapted to receive the two limbs of a shackle 1 and which slightly encroach on the central cavity so as to allow the rings to engage notches $4^a$—$4^h$ made in the limbs of the shackle 1. Notches $4^a$—$4^d$ of one limb are staggered relative to the notches $4^e$—$4^h$ of the other limb, and each ring has an elongated circumferential notch 9 in which to admit the full portion of one limb while the ring engages a notch in the opposite limb. The notch 9 allows the ring to be turned through an angle $\alpha$ and the ring has another notch 8 which, in one position of rotary adjustment of the ring, registers with the opposite limb of the shackle so as to leave the latter disengaged. Each ring is provided, in a suitable manner, with a stud 7 which projects through a slot in the side of the casing and which can be used for adjusting the ring. The position of the stud 7 relative to the notch 8 and to the casing slot is such, that the stud determines the unlocking position, i. e., the registration of the notch 8 with the shackle limb, by abutment against one edge of the slot. In Fig. 3 the unlocking movement is anticlockwise, and it is evident that, by turning the ring over on the other side and reversing the shackle, the unlocking movement will be a clockwise one. By arranging the notch 8 opposite different ends of the notch 9 and altering the position of the stud 7 accordingly, the rings can be made to open in either direction in any given position in the pile, and a suitable combination is made up which must be known for opening the lock. While the combination can be changed by a turning over of the rings and by a reversal of the shackle, as previously described, it can also be changed by piling the rings in a different order or by replacing individuol rings by others adapted for unlocking movement in the opposite direction without reversal of the shackle. As the rings are arranged loosely in direct contact with each other, these changes can be easily effected. The casing is closed by a cover 2, which screws onto a spindle 6 and which is normally locked by the shackle, the spindle being squared to the casing so as to prevent it from being unscrewed.

I have illustrated and described a preferred and satisfactory embodiment of the invention, but it will be obvious that changes may be made therein, within the spirit and scope thereof, as defined in the appended claims.

I claim:—

1. A combination padlock of the character described, comprising a U-shaped shackle having notched limbs, the notches of one limb being staggered relative to those of the other limb, a casing having bores in which to receive the limbs of the shackle, and a plurality of superposed rings arranged rotatably in said casing so as to encroach on the bores and engage the notches of the shackle limbs, each ring having an elongated notch which registers with the full portion of one limb so as to allow a partial rotation of the ring through the notch in the opposite shackle limb, the ring having also a notch which, in one end position of the ring, registers with said latter limb so as to allow the shackle to move.

2. A combination lock of the character described, comprising a shackle having spaced parallel notched limbs, a casing having passages in which to receive the limbs of the shackle, and a plurality of superposed individually and independently rotatable members in said casing arranged to engage the notches of the shackle limbs, each member having an elongated portion adapted to permit limited rotation in opposed directions relatively to the full portion of one limb, the member also having a shackle releasing portion which in one position of the member registers with the other limb, so as to allow the shackle to move.

3. A combination lock of the character described, comprising a shackle having spaced parallel notched limbs, a casing having passages in which to receive the limbs of the shackle, and a plurality of superposed individually and independently rotatable members in said casing arranged to engage the notches of the shackle limbs, and provided with releasing portions, which in one position of the respective members register with the limbs to allow the shackle to move, and means limiting said members to a partial rotation, said means adapted in a limited position of movement of said members with respect to said means to determine the unlocked position of said members.

4. A combination lock of the character described, comprising a locking member having spaced abutment portions, a casing having a passage in which to receive said member, a plurality of superposed individually and independently rotatable members in said casing arranged to be engaged at their outer peripheries in the spaces between said abutments of the locking member, and provided with releasing portions, which in one position of the respective members register with said locking member to allow it to move, and means limiting said members to a partial rotation, said means adapted in a limited position of movement of said members with respect to said means to determine the unlocked position of said members.

5. A combination lock of the character described, comprising a locking member having spaced abutment portions, a casing having a passage in which to receive said member, a plurality of superposed individually and independently rotatable members in said casing having a common axis removed from the axis of said locking member, and arranged to be engaged in the spaces between said abutments of said locking member, and provided with releasing portions, which in one position of the respective members register with said member to allow it to move, and means limiting said members to a partial rotation, said means adapted in a limited position of movement of said members with respect to said means to determine the unlocked position of said members.

6. A combination lock of the character described, comprising a casing having a cylindrical pocket and provided with an opening extending longitudinally of said pocket, the wall of said pocket being provided with a passage extending longitudinally thereof, a locking member engaged in said passage and having longitudinally spaced abutment portions extending into said pocket, and a plurality of rotatable members disposed in superposed relation in said pocket adapted in the locked position to be engaged in the spaces between said abutment portions of said locking member, and provided with releasing portions adapted to register with said locking member in the unlocked position, and projecting means on each of said members extending into said opening of the casing and adapted in a limited position of movement within said opening to determine the unlocked position of said rotatable members.

7. A combination lock of the character described, comprising a casing having a cylindrical pocket and provided with an opening extending longitudinally of said pocket, the wall of said pocket being provided with opposed and parallel passages extending longitudinally thereof, a shackle having spaced parallel limbs slidably engaged in said respective passages, each limb having longitudinally spaced abutment portions extending into said pocket, and a plurality of rotatable members disposed in superposed relation in said pocket adapted in the locked position to be engaged in the spaces between said abutment portions of said limbs, and provided with releasing portions adapted to register with said limbs in the unlocked position, and projecting means on each of said rotatable members extending into said opening and adapted in a limited position of movement within said opening to determine the unlocked position of said rotatable members.

8. A combination lock of the character described, comprising a casing having a passage, a locking member engaged in said passage, a plurality of individually and independently movable members carried by said casing and adapted to have limited partial movement in one or the other directions, and each adapted in one of two moved positions to register with said locking member to permit its movement in said passage, and adapted out of said moved position to lockingly engage said locking member, said members adapted upon inversion to be operative in opposed direction from their obverse position.

9. A combination lock of the character described, comprising a locking member having spaced abutment portions at opposed sides, a casing adapted to receive said member, a plurality of individually and independently movable members in said casing arranged to be engaged in the spaces between said abutment portions of the locking member, said movable members adapted to individually engage in the spaces between said abutment portions at the respective sides of said locking member, and being provided with releasing portions, said movable members adapted to have limited partial movement in opposed directions, said releasing portions adapted in one position of the respective members to register with said locking member to allow it to move.

10. A combination lock of the character described, comprising a locking member having spaced abutment portions at opposed sides, the abutment portions at one side being staggered with relation to the abutment portions at the other side, a casing adapted to receive said member, a plurality of movable members in said casing arranged to be engaged in the spaces between said abutment portions of the locking member, the alternate movable members adapted to individually engage in the spaces between said abutment portions at the respective sides of said locking member, and being provided with releasing portions, said movable members adapted to have limited partial movement in opposed directions, said releasing portions adapted in one position of the respective members to register with said locking member to allow it to move.

In testimony whereof I have signed my name to this specification, this 13th day of May, 1925.

ERNEST TOBLER.